May 21, 1968   G. R. KERN, JR   3,384,108
SPRING-DRUM REEL WITH LOCK AND RELEASE
Filed Oct. 27, 1966   2 Sheets-Sheet 1
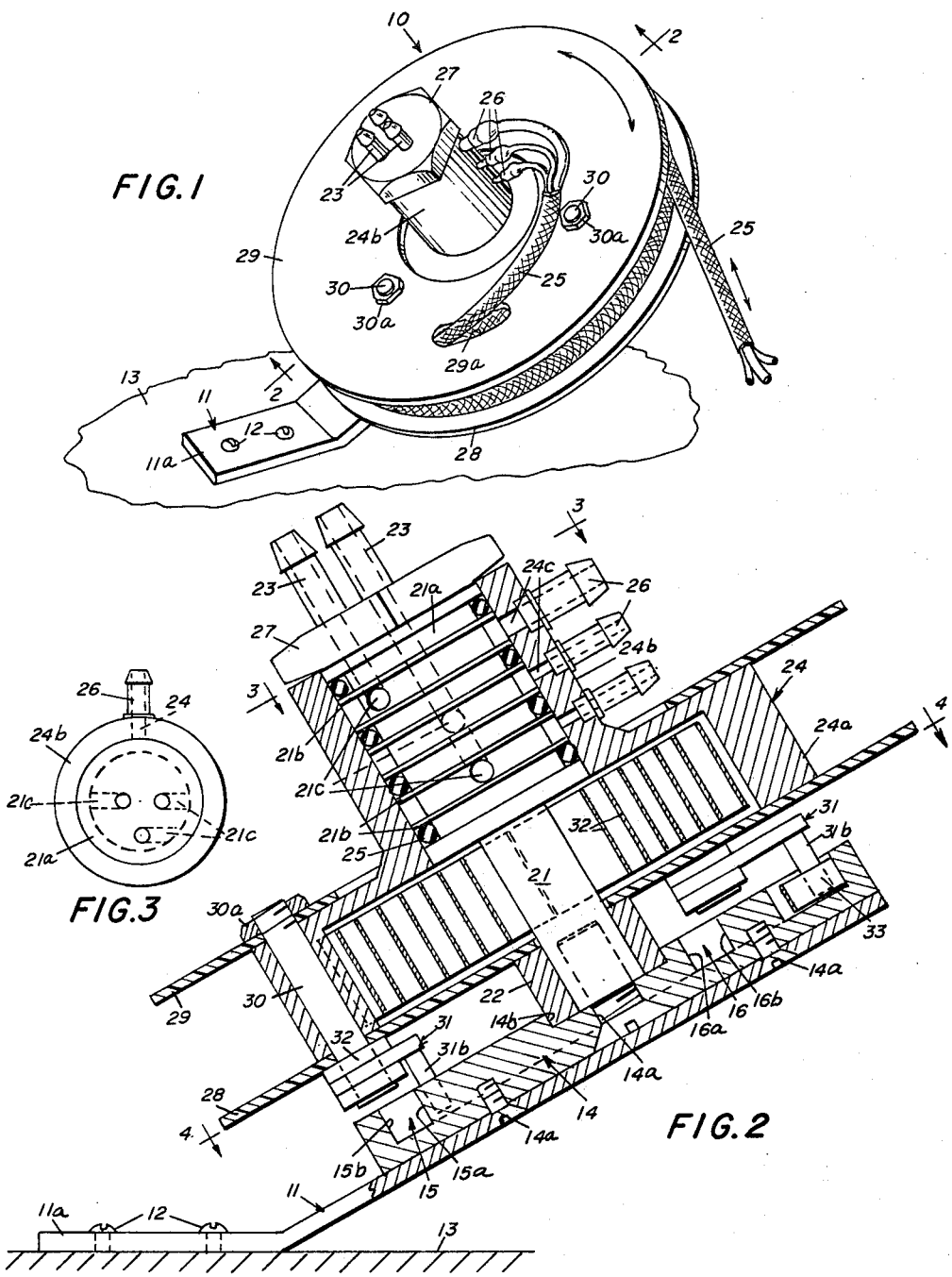
INVENTOR
GEORGE R. KERN, JR.
BY Beale and Jones
ATTORNEYS May 21, 1968  G. R. KERN, JR  3,384,108

SPRING-DRUM REEL WITH LOCK AND RELEASE

Filed Oct. 27, 1966  2 Sheets-Sheet 2

INVENTOR
GEORGE R. KERN, JR.

BY Beale and Jones
ATTORNEYS

United States Patent Office 3,384,108
Patented May 21, 1968

3,384,108
SPRING-DRUM REEL WITH LOCK AND RELEASE
George R. Kern, Jr., 5525 23rd St. N.,
Arlington, Va. 22205
Filed Oct. 27, 1966, Ser. No. 589,902
6 Claims. (Cl. 137—355.17)

ABSTRACT OF THE DISCLOSURE

A spring-driven type reel wherein selected pull and release on the member wound thereon permits locking the reel in particular unwound position or permits complete or selected rewind.

This invention is directed to improvements in spring-drum type reels wherein selected pull and release on the member wound thereon permits locking the reel in a particular unwound position or permits complete or selected rewind.

An object of the invention is to provide a positive control over the amount of a flexible member wound on a spring biased drum type reel by application and release of a pull force applied to the flexible member external of the reel.

Another object of the invention is to provide a self-storing device for dispensing and retrieving small hoses, cables and flexible members that may be locked on command of the operator at a position within approximately six inches of that chosen by the operator.

A further object of the invention is to provide a dispensing and retrieving device as small as practical which will contain enough hose for practical purposes in a dental office.

A still further object of the invention is to provide a spring-drum reel for paying out a flexible member wound thereon that is under the control of pull and release of force applied to the stored member and that may be mounted in any attitude and still be fully operable.

Still further objects and the entire scope of applicability of the present invention will become apparent from the detailed description given hereinafter. It should be understood, however, that the detailed description and specific example is given by way of illustration only and, while indicating a preferred embodiment of the invention, is not given by way of limitation, since various changes and modifications within the spirit and scope of the invention will become apparent to those skilled in the art from this detailed description.

For a more complete understanding of the nature and scope of the invention reference is had to the drawings, description that follows and the claims.

In the drawings:

FIG. 1 is a perspective of the reel assembly for storing and feeding hoses;

FIG. 2 is a section on line 2—2 of FIG. 1 on an enlarged scale;

FIG. 3 is a sectional view of the hose connections and conduits leading thereto along line 3—3 of FIG. 2 on a reduced scale;

Throughout the description like reference numbers refer to similar parts.

Figure 4:
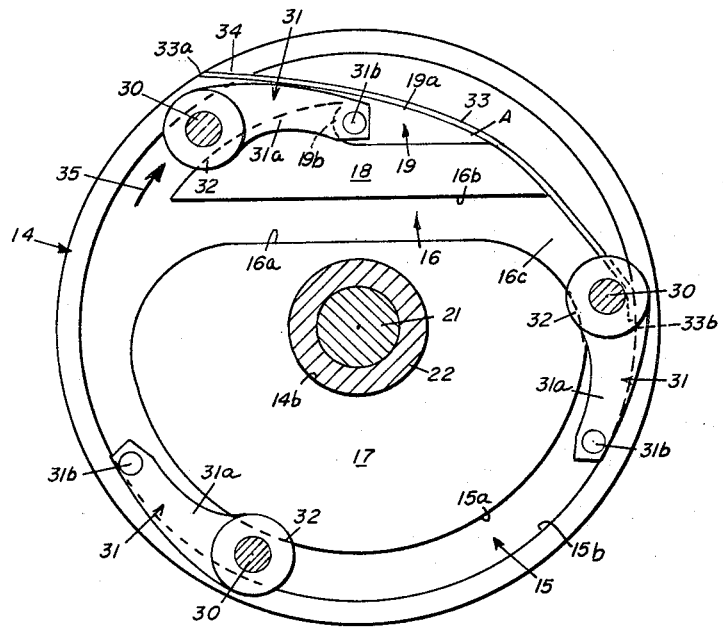
FIG. 4 is a sectional view along line 4—4 of FIG. 2, the cam tracks and stop recess in the stationary mounting plate and the action of the cam followers therein, one cam follower on one pawl being in the lock recess.

A spring-drum type reel is generally indicated at 10. A plate member 11 is provided with a bent foot portion 11a which is secured by screws 12 to a support 13. This plate 11 may be mounted in any attitude but is shown here at an angle of about 30° to the support and like reels could be mounted closely adjacent thereto in a like attitude.

On the upper face of plate member 11 is attached a cam track plate 14 as by screws 14a. In the face of the cam track plate 14 is formed an outer peripheral generally circular first cam 15 having a radially inward face or wall 15a and a radially outward face or wall 15b. So also there is a second cam track 16 which extends as a chord dividing the plate 14 into a large segment 17 and a small segment 18. This cam track 16 extends about half the radial distance from the center to the periphery of plate 14 in the example shown. This second cam track 16 merges at its ends into the first cam track 15. The second cam track 16 has an inner wall face 16a and an outer wall face 16b.

Between the second cam track 16 and the first cam track 15 in the smaller hegmental area 18 is a stop recess 19 that extends parallel to the cam track 16 and opens on one side into cam track 15 in a throat opening 19a. The rear end 19b of the recess or slot 19 terminates in a semicircular wall to serve as a seat or stop for a cam follower on each pawl pivotally attached to a drum, all to be described hereinafter. The cam plate 14 is circular and has an aperture 14a at its center to receive a flat head securing screw that threads into the end of a spindle member generally indicated at 21 whose adjacent end is received in a recess 14b in plate 14 and is surrounded by a bushing 22 whose adjacent end is received in the same recess 14b.

The spindle 21 rotatably receives a drum to be described. Spindle 21 has a small portion acting as a journal for the drum and an enlarged portion 21a that protrudes axially outward beyond the drum. For the hose reel type here illustrated the spindle portion 21a has spaced apart radially extending flanges 21b thereon which serve to form annular recesses therebetween. In this spindle portion 21a there are inwardly extending passages 21c communicating with axially outwardly extending respective passages so as to form a communication to every other annular recess. The outer ends of the axially extending passages communicate with fixed on hose fittings 23.

The drum is generally indicated at 24 and has a central hub 24a that receives the hose 25 or other flexible member to be wound thereon. The hub 24 extends axially outward as a reduced sleeve 24b about the spindle portion 21a having the spaced circular flanges 21b. Between certain flanges is received O-ring seals 25 which seal off the annular recess from each other. Radially extending passages 24c are formed in the projecting hub portion 24b to communicate with the annular recesses. Hose fittings 26 are secured to the hub 24b at each of the passageways 24c.

An end member 27 is secured to the end of spindle portion 21a and abuts the end of the sleeve portion 24b of the drum.

The hub portion 24a of the drum has end plates 28 and 29 secured thereto by bolt members 30. There are three of these shown spaced apart equally and extending generally in line with the first cam track 15. These bolts 30 have pivotally mounted thereon pawls 31. A washer or spacer member 32 is received on each bolt between its pawl and the end plate 28. A nut 30a is threadedly received on the threaded end of bolt 30 opposite to the securement of its pawl.

Each pawl 31 has an arm 31a and a cam follower 31b extending transversely therefrom away from end plate 28 and is received in the cam track slots where it is guided under certain conditions of winding and unwinding of the drum.

A flat spiral coil take up spring 32 has its inner end fixed to the journal of spindle 21 and its outer end to the inside of drum portion 24a and serves to rewind the drum.

The hose generally indicated at 25 and here shown as a composite made up of three flexible tubes suitably held in an encircling sheath is lead through an aperture 29a in end drum end plate 29 to where it is wound on the drum portion 24a for storage thereon between the end plates 28 and 29.

Figure 5:
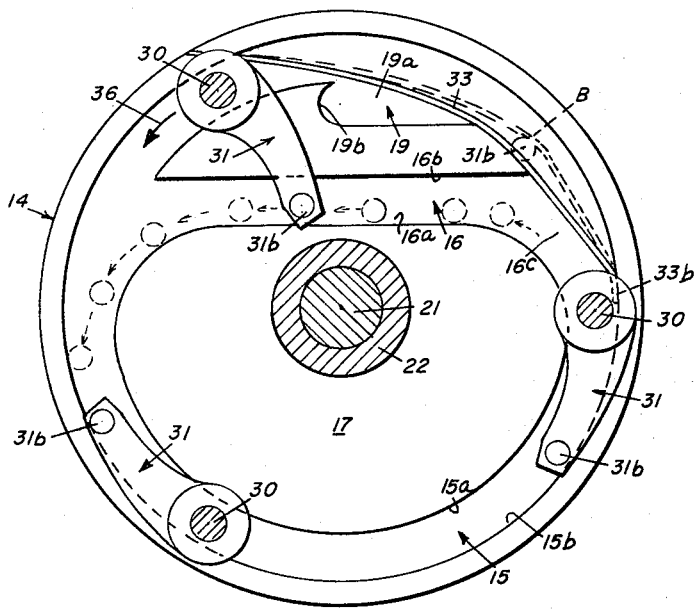
FIG. 5 is a view like FIG. 4 but with the action of the cam followers on the pawls during rewind of the reel.

A flat leaf spring 33 is secured at one end 33a in a slot 34 in the cam track plate 14 and extends in the first cam track 15, across the throat 19a of stop recess 19, across the end 16c of the second cam track 16 where it merges with the first cam track 15 and on so that its other end 33b, see FIG. 5, rides against the outer wall face 15b of the first cam track 15.

In FIG. 4 the hose has been unwound in the direction of rotation of drum 24 as indicated by the arrow 35 as a result of a pull applied to hose 25 and the coil spring 32 tends to be wound up. The cam follower 31b on pawl 31 has ridden up against the flat leaf spring 33 and as it rides in the throat 19a tends to wedge in against the leaf spring 33 at A and thus causes a noticeable resistance to an operator pulling out the hose or cable 25. If the operator wants the hose to stop in this pulled out position, he eases off on the pull and the cam follower rides back in stop recess 19 and seats in the end 19a by the action of the coil spring 32 that causes the drum to rotate in the direction reverse of that of arrow 35, see arrow 36 in FIG. 5.

If more of the hose 25 is pulled out, or hose 25 has had a continuous pull applied, the cam follower 31b rides against the leaf spring 33 at A and bends it outwardly as indicated by the broken line in FIG. 5 at B. If the pull is continued, cam follower is moved on riding against the outer wall 15b in the first cam track 15.

In order to rewind or take in the hose 25, see FIG. 5, the hose is pulled out slightly and the pull is released whereby the drum reverse direction under the influence of coil spring 32. The cam follower 31b rides against the inner face leaf spring 33 and is directed into the second cam track 16 at its mergence 16c with the first cam track 15. With no pull continued to be applied to hose 25, the hose is wound up as the cam followers 31b on the pawls 31 ride in the cam track 15 bigger sector and into and through the second cam track 16.

The cam followers follow along the outer wall 15a of the first cam track in both unwinding and winding.

The stationary mounting plate and drum hub may be of aluminum. The pawls, and fitting 27 and hose fittings may be of brass. The end plates 28 and 29 of the drum or reel may be made of rigid and thin plastic material.

There is here provided a spring-drum reel with lock and release against spring bias that is reliable in operation. It is useful in many applications for storage of cables, hoses and the like.

What is claimed is:

1. A spring-drum reel with lock and release against spring bias comprising, a plate member for stationary mounting; a drum including two end members for carrying a flexible member thereon rotatably mounted on said plate and having a biasing means for rewinding the drum in one direction of rotation; said plate having an outer generally circular first cam track being open adjacent said drum and having inner and outer peripheral track faces therein, a second cam track extending as a chord and joining with the first cam track and dividing the first cam track into a large and a small segment, a stop recess in the plate member and having an open throat in the inner peripheral track face of the small segment of the first cam track and extending to act as a stop for movement in rewind direction of a cam follower, said drum having one of its end members facing adjacent the cam tracks and recess in the stationary plate member; a leaf spring having one end fixed in said stationary plate member in its outer peripheral first cam track face and extending in a tangential manner over the throat of said stop recess and across the adjacent joining end of said second cam track with said first cam track and having its other end biased against the outer peripheral track face of the first cam track whereby it forms a guide way from first to second cam track; at least one pawl having an end pivotally mounted on said one end member of the drum and adjacent said first cam track, the free end of the pawl having a cam follower guided in said cam tracks and said stop recess under certain conditions of unwind and rewind of said drum; and a flexible member attached to said drum for unwinding and rewinding; said cam follower following the first cam track on unwinding force applied to said flexible member and passing under said leaf spring, said cam follower on release of said unwinding force when the follower is under said leaf spring at said throat of the stop recess moves on rewind movement of said drum into the recess and stops the rewind of said drum, and said cam follower on release of said unwinding force when the follower is under said other end portion of the leaf spring on rewind movement of said drum rides against the inwardly facing surface of the leaf spring and is guided into said adjacent end of the second cam track thus permitting rewind of the flexible member on said drum as said cam follower rides in rewind direction in said second cam track to the first cam track and back to the second cam track.

2. A spring-drum reel according to claim 1 wherein there are a plurality of such pawls rotatably mounted on said one end member of the drum.

3. A spring-drum reel according to claim 2 wherein there is an axially extending spindle attached to said stationary mountable plate member and it extends axially through and protruding beyond said drum and rotatably supports said drum; the other end member of said drum having an axially and outwardly extending sleeve extending over the protruding portion of said axial mounting spindle; said axially protruding portion of the spindle having an annular recess thereon and a passageway communicating with said annular recess and extending axially from said protruding portion for further attachment to a hose; said sleeve of the other end member of the drum having a radially extending passageway therethrough communicating with said annular passageway therewithin on said spindle; and a hose leading from passageway in the sleeve, through an aperture in said other end member of the drum and onto said drum for winding and unwinding thereon.

4. A spring-drum reel according to claim 3 wherein there are a plurality of said annular recesses spaced apart and isolated from each other by annular seals on the protruding spindle, said protruding spindle has such a passageway communicating with each of said annular recesses for connection to a plurality of hoses, said sleeve has a plurality of such radially extending passageways communicating with the annular recesses and there are a plurality of hoses connected with said last passageways and wound on said drum.

5. A spring-drum reel according to claim 6 wherein each of said pawls is mounted on said drum by pivot pins that extend through the drum and the end members of the drum.

6. A spring-drum reel according to claim 1 wherein said second cam track extends as a chord about half the radial distance out from the center of said stationary mountable plate member and said stop recess extends with its inner side wall face parallel to said second cam track and has an arcuate inner end for stopping and nesting said cam follower on the pawl.

References Cited
UNITED STATES PATENTS

| | | | |
|---|---|---|---|
| 2,698,146 | 12/1954 | Becker | 242—107.7 |
| 2,887,121 | 5/1959 | Magee | 242—86 X |
| 3,021,090 | 2/1962 | Becker | 242—107.7 |
| 3,110,453 | 12/1963 | Becker et al. | 242—86 X |
| 3,131,883 | 5/1964 | Angell et al. | 242—107.7 |

WILLIAM S. BURDEN, *Primary Examiner.*